Feb. 10, 1959    J. E. SCHMITZ ET AL    2,872,955
COMBINATION FOOT CONTROLLED SWING CUT-OFF MITER AND RIP SAW
Filed March 19, 1956    2 Sheets-Sheet 1
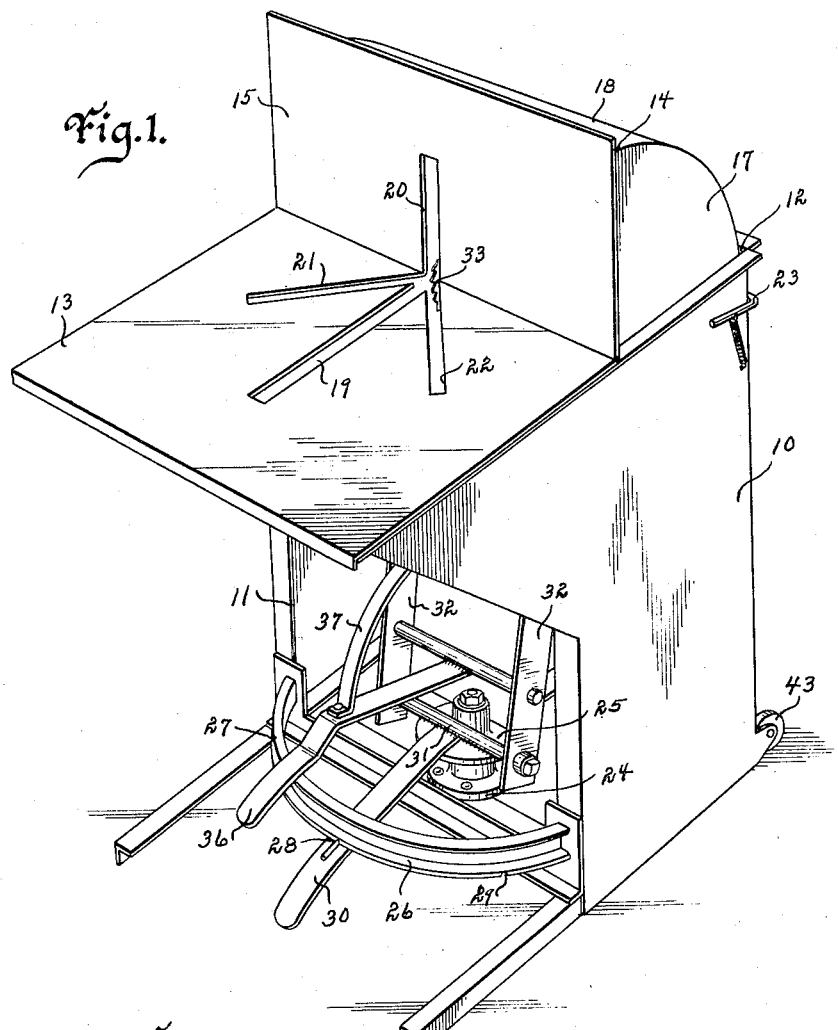
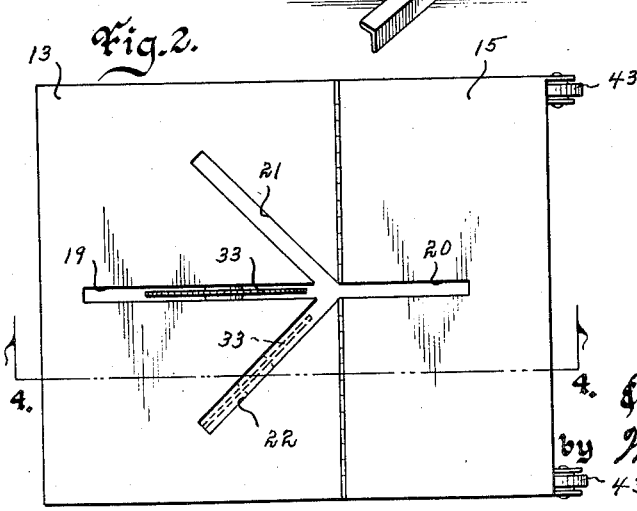
Inventors
James E. Schmitz
& Vincent O. Schmitz
by M. Talbert Dick
Attorney

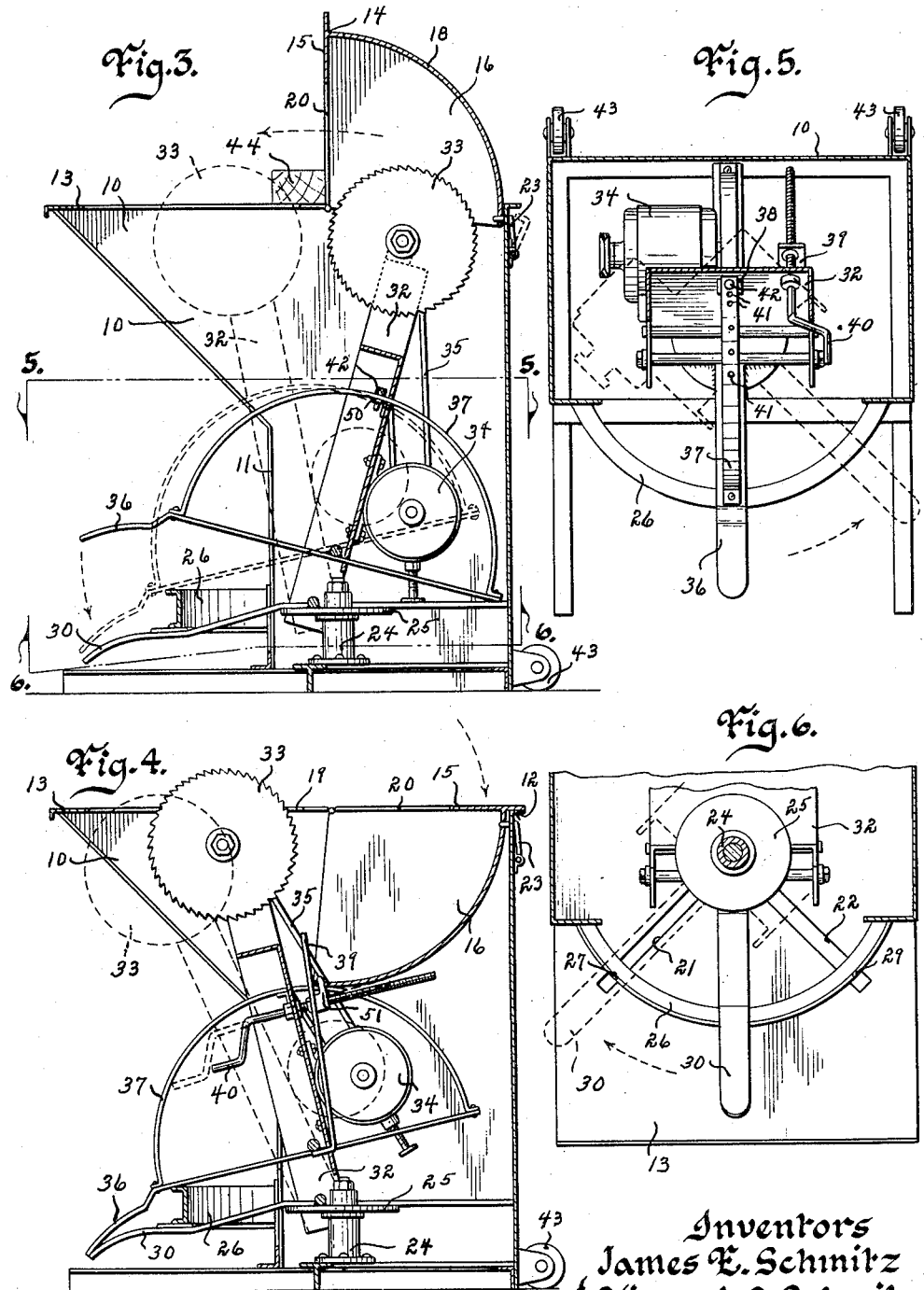

United States Patent Office 2,872,955
Patented Feb. 10, 1959

2,872,955

COMBINATION FOOT CONTROLLED SWING CUT-OFF MITER AND RIP SAW

James E. Schmitz and Vincent O. Schmitz, Cerro Gordo, Iowa

Application March 19, 1956, Serial No. 572,351

2 Claims. (Cl. 143—46)

This invention relates to mechanized saws and more particularly to one that has a foot controlled swingable saw blade.

The use of powered saws is increasing. Most such saws have a table with a non-swingable circular cutting blade, and in use the member to be cut is pushed onto the blade. Obviously, such a construction has danger possibilities and also miter cuts are most difficult to accomplish. Furthermore, adjustments are either impossible or slow and tedious.

Therefore, one of the principal objects of our invention is to provide a table type saw having a foot operated swingable saw blade.

A further object of our invention is to provide a table saw that may be quickly and easily adjusted to produce miter cuts.

A still further object of this invention is to provide a table saw that may also be used for ripping.

A still further object of this invention is to provide a safe adjustable swingable saw that is completely under the control of the operator at all times.

Still further objects of our invention are to provide a saw that is economical in manufacture and durable in use.

These and other objects will be apparent to those skilled in the art.

Our invention consists in the constuction, arrangement, and combination of the various parts of the device, whereby the objects contemplated are attained as hereinafter more fully set forth, pointed out in our claims, and illustrated in the accompanying drawings, in which:

Fig. 1 is a perspective view of our saw ready for use,

Fig. 2 is a top plan view of the saw in condition for ripping lumber,

Fig. 3 is a longitudinal sectional view of the device and more fully illustrates its construction, Fig. 4 is a longitudinal sectional view of our saw taken on line 4—4 of Fig. 2, Fig. 5 is a cross sectional view of the device taken on line 5—5 of Fig. 3, and Fig. 6 is a cross sectional view of the saw taken on and looking upwardly from line 6—6 of Fig. 3.

The numeral 10 designates a housing having its lower front 11 open and its forward top 12 open. The numeral 13 designates a horizontal table top on the top of the housing and to the rear of the opening 12 as shown in Fig. 3. The numeral 14 designates a hood having a flat side 15 hinged to the forward edge of the top 13, two ends 16 and 17, and a curved forward side 18. When this hood is in elevated position the flat side 15 will be a vertical wall just forward of the table top. When the hood is lowered its curved side and two ends will be in swung position inside the housing with the flat side 15 horizontal, in the same plane as the table top, and closing the forward open top of the housing, as shown in Fig. 4. The numeral 19 designates a longitudinal slot in the table top communicating with a like slot 20 in the hood side 15, as shown in Fig. 1. The numeral 21 designates an angle or miter slot in the table top having its forward end communicating with the slot 20. The opposite angle or miter slot in the table top also communicates with the slot 20 and is designated by the numeral 22. Any suitable catch means 23 may be used to hold the hood either in lowered or elevated condition. The numeral 24 designates a bearing means secured in the lower portion of the housing 10. The numeral 25 designates a plate member rotatably mounted on and to the bearing 24, as shown in Fig. 1. The numeral 26 designates an arcular horizontal track extending rearwardly from the bottom rear side portion of the housing, and having notches 27, 28 and 29 at its bottom length. The numeral 30 designates a spring arm secured to the plate 25 and capable of selectively entering and engaging any one of the notches 27, 28 and 29. The numeral 31 designates a horizontal shaft bar fixed on the plate 25. Pivoted to this bar 31 is the swingable saw frame unit 32. Rotatably mounted in the top of the frame 32 is an ordinary circular saw blade 33. The numeral 34 designates an electric motor secured to the saw frame and operatively connected to the circular saw by any suitable means ruch as the belt 35. This motor is adapted to be in communication with a source of electric energy and the usual switch (not shown) for controlling the same may be located at any suitable location for actuation by either hand, foot, or leg of the user of the saw. The numeral 36 designates the coot control lever bar pivoted near its center length to the lower portion of the saw frame 32. The numeral 37 designates a one-half circular bar secured on the lever 36 and which extends upwardly to pass through a slot 38 in the saw frame. The numeral 39 designates an arm operatively hingedly secured to the saw frame and extending upwardly, as shown in Fig. 4. The numeral 40 designates a crank arm rod rotatably and non-slidably mounted through the saw frame and operatively threaded through the arm 39 by virtue of the lug 51. The numeral 41 designates a plurality of holes in the member 37. A pin or like means 42 may be selectively placed in any one of these holes, and through an L-bracket 50 on the saw frame, as shown in Fig. 5. For aiding in the portability of the device surface engaging wheels 43 may be mounted to the housing.

The practical operation of the device is as follows:

With the device adjusted as shown in Fig. 1, and the motor turned on, the member 44 to be cut is laid on the table top and adjacent the vertical guide wall 15 of the hood. The circular saw 33 will be rotating, but will be safe and shielded within the hood 14, as shown in Fig. 3. The pin 42 will adjustably secure the saw frame to the foot pedal. By placing the foot of the user on the foot pedal or lever 36 and depressing the same, the saw frame will be swung rearwardly pulling the circular saw 33 through the slots 20 and 19, and also through the lumber 44. This action is due to the linkage of the foot lever and saw frame 32. The movement of the saw frame relative to the movement of the foot lever is adjustably obtained by the positioning of the pin 42. By releasing pressure on the foot lever, the saw frame and its saw will swing forwardly and out of the way behind the shield hood 14. In the previously described operation the member 30 was engaging the central notch 28. To miter cut a right angle the member is moved to engage the notch 29. This action horizontally rotates the plate 25, saw and saw frame unit, and the foot lever. Then when the foot lever is depressed the circular saw will proceed through the slots 20 and 22. To obtain a miter cut having a left angle the part 30 is moved to engage the notch 27 and then the circular saw will pass through the slot 20, and into the slot 21. To rip a board, the hood 14 is swung forwardly and downwardly into the housing and fastened, as shown in Fig. 4. This provides a flat table surface comprising the top 13 and flat hood side 15. The pin 42 is removed. The circular saw may be vertically adjusted and held relative to the table top by the hood being lowered and locked into the housing for engagement with the lug 51 of arm 39 by the lug 51 entering and locking in a hole in the hood, as shown in Fig. 4, and then rotating the crank arm 40 accordingly. Thus the saw frame is held from swinging movement in both directions for the purpose of ripping boards. When the hood is raised, the pin 42 is replaced to secure the saw frame to the food lever pedal.

Some changes may be made in the construction and arrangement of our combination foot controlled swing cut-off miter and rip saw without departing from the real spirit and purpose of our invention, and it is our intention to cover by our claims, any modified forms of structure or use of mechanical equivalents which may be reasonably included within their scope.

We claim:

1. In a power saw, a frame housing, a table top having a plurality of slots, an enclosed hood having a width substantially that of the width of said table top, having a forward side, two ends and a flat side operatively hingedly secured to one side of said table top; said flat side of said hood having a slot communicating with the slots of said table top, a saw frame horizontally hingedly mounted to said frame housing, a circular saw rotatably mounted on said saw frame and capable of being selectively moved into and out of any one of said first slots from said second mentioned slot when said flat side of said hood is perpendicular to said table top by the swinging action of said saw frame, a prime mover operatively secured to said circular saw, and a foot lever operatively secured to said saw frame.

2. In a power saw, a frame housing, a horizontal table top having a plurality of slots, an enclosed hood having a width substantially that of the width of said table top, having a forward side, two ends and a flat side operatively hingedly secured to one side of said table top; said flat side of said hood having a slot communicating with the slots of said table top, a saw frame hinged and rotatably secured to said frame housing, a circular saw rotatably mounted on said saw frame and capable of selectively being moved into and out of any one of said first slots and said second mentioned slot when said flat side of said hood is perpendicular to said table top by the swinging action of said saw frame, a prime mover operatively secured to said circular saw, and a foot lever operatively secured to said saw frame; said hood capable of being swung to an upright position where its flat side will extend upwardly at a right angle to said table top or swung to a lowered position where its flat side will be in a common plane with said table top.

References Cited in the file of this patent
UNITED STATES PATENTS

| | | |
|---|---|---|
| 702,884 | Pence | June 17, 1902 |
| 2,422,843 | Mooradian | June 24, 1947 |
| 2,488,077 | Buday | Nov. 15, 1949 |

FOREIGN PATENTS

| | | |
|---|---|---|
| 93,944 | Germany | Sept. 20, 1897 |